(12) United States Patent
Kluftinger et al.

(10) Patent No.: US 11,988,684 B2
(45) Date of Patent: May 21, 2024

(54) WHEEL SPEED SENSOR FOR A UTILITY VEHICLE

(71) Applicant: Knorr-Bremse Systeme Fuer Nutzfahrzeuge GmbH, Munich (DE)

(72) Inventors: Andre Kluftinger, Kleinheubach (DE); Pravin Jawarikar, Distr. Buldhana (IN); Michael Hauff, Munich (DE); Andreas Windisch, Unterhaching (DE); Tobias Rohse, Schwieberdingen (DE); Klaus Lechner, Pretzfeld (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 49 days.

(21) Appl. No.: 17/595,996

(22) PCT Filed: Jun. 4, 2020

(86) PCT No.: PCT/EP2020/065457
§ 371 (c)(1),
(2) Date: Dec. 1, 2021

(87) PCT Pub. No.: WO2020/245256
PCT Pub. Date: Dec. 10, 2020

(65) Prior Publication Data
US 2022/0221480 A1    Jul. 14, 2022

(30) Foreign Application Priority Data
Jun. 6, 2019 (DE) .................. 10 2019 115 396.4

(51) Int. Cl.
*G01P 1/00* (2006.01)
*G01P 3/44* (2006.01)

(52) U.S. Cl.
CPC ............... *G01P 1/006* (2013.01); *G01P 3/44* (2013.01)

(58) Field of Classification Search
CPC ...................................... G01P 1/006
(Continued)

(56) References Cited

U.S. PATENT DOCUMENTS 7,057,173 B2 * 6/2006 Wright ............... G01R 33/09
250/338.2
2004/0119464 A1    6/2004 Taneyhill
(Continued)

FOREIGN PATENT DOCUMENTS

CA    2738168 A1    10/2012
CN    101191751 A    6/2008
(Continued)

OTHER PUBLICATIONS

Chen. Translation of CN 204154733 U. Published Feb. 2015. Accessed Apr. 2023. (Year: 2015).*
(Continued)

*Primary Examiner* — Walter L Lindsay, Jr.
*Assistant Examiner* — Philip T Fadul
(74) *Attorney, Agent, or Firm* — NORTON ROSE FULBRIGHT US LLP; Gerard A. Messina

(57) ABSTRACT

A wheel speed sensor for a utility vehicle, including: an active pulse sensor, a housing to at least partially enclose the active pulse sensor, and a protective cap to at least partially cover the housing; in which the wheel speed sensor has at least one component to adapt a temperature resistance capability of the wheel speed sensors so that the wheel speed sensor is usable in a high temperature environment.

17 Claims, 4 Drawing Sheets

(58) Field of Classification Search
USPC .......................................................... 73/497
See application file for complete search history.

(56) References Cited

U.S. PATENT DOCUMENTS

| | | |
|---|---|---|
| 2004/0189285 A1 | 9/2004 | Jenoyama |
| 2015/0070004 A1* | 3/2015 | Lerchenmueller ...... G01P 3/495 |
| | | 324/207.25 |
| 2020/0339105 A1 | 10/2020 | Kluftinger et al. |

FOREIGN PATENT DOCUMENTS

| | | |
|---|---|---|
| CN | 104020311 A | 9/2014 |
| CN | 104029666 A | 9/2014 |
| CN | 204154733 U | 2/2015 |
| CN | 206678980 U | 11/2017 |
| DE | 3513148 A1 | 10/1986 |
| DE | 29718791 U1 | 1/1998 |
| DE | 102006036415 A1 | 2/2008 |
| DE | 102017103979 A1 | 8/2018 |
| EP | 0911614 A1 | 4/1999 |
| JP | 2000180460 A | 6/2000 |
| JP | 2003065835 A | 3/2003 |
| JP | 2003083774 A | 3/2003 |
| JP | 2014153251 A | 8/2014 |

OTHER PUBLICATIONS

Wei. Translation of CN 104020311 A. Published Sep. 2014. Accessed Apr. 2023. (Year: 2014).*
International Search Report for PCT/EP2020/065457 dated Jul. 21, 2020.

* cited by examiner

WHEEL SPEED SENSOR FOR A UTILITY VEHICLE

FIELD OF THE INVENTION

The invention relates to a wheel speed sensor for a utility vehicle, in particular a wheel speed sensor for a utility vehicle which is arranged in the region of a brake of a wheel on a chassis of the utility vehicle.

BACKGROUND INFORMATION

It is believed to be necessary to detect wheel speeds of individual wheels of vehicles, in particular to enable a function of assistance systems, for example, ABS, ASR, or ESP. An accurate detection of the wheel speed is necessary to activate appropriate algorithms in borderline situations. To detect wheel speeds accurately, wheel speed sensors are known which are arranged in the region of a wheel of the vehicle to detect the speed as directly as possible, without deviations due to a mechanical transmission.

In the passenger vehicle field, active wheel speed sensors are increasingly being used, thus wheel speed sensors which are activated by applying a supply voltage and generate an output signal. The active wheel speed sensors already generate signals in the wheel speed sensor, which have, for example, a speed-independent constant amplitude. Therefore, a data protocol is already generated in the wheel speed sensor which, for example, transmitted via a bus system, can be evaluated in a control unit. In addition, there is the possibility of implementing diagnostic functions.

It is believed that a use of the active wheel speed sensors and a utilization of their advantages has heretofore not been possible in the utility vehicle field, since a thermal stress of the sensor is greater here in the region of the wheel than in the passenger automobile field and in particular chips of Hall sensors do not withstand the thermal stress.

SUMMARY OF THE INVENTION

The invention is thus based on the object of remedying the above disadvantage and providing an active wheel speed sensor which can also be used in a region having a higher thermal stress.

The object may be achieved by a wheel speed sensor as described herein. Advantageous refinements are contained in the further descriptions herein.

According to one aspect of the invention, a wheel speed sensor for a utility vehicle has an active pulse sensor, a housing, which is configured to at least partially enclose the active pulse sensor, and a protective cap, which at least partially covers the housing. The wheel speed sensor furthermore has at least one component which is configured to adapt a temperature resistance capability of the wheel speed sensor so that the wheel speed sensor is usable in a high temperature environment.

The active pulse sensor is a sensor which detects pulses which are generated by a change of a magnetic field in a detection region of the sensor. The change of the magnetic field in the region of the sensor takes place either by introducing a magnetic body, for example, a rotating pole wheel having permanent magnets attached thereon, into the detection region or by changing a stationary magnetic field in the region of the sensor. The stationary magnetic field is changed by introducing a ferromagnetic body into the detection region. A pulse wheel, which has teeth and gaps on the circumference, is moved in the detection region of the sensor for this purpose and the change of the magnetic field due to the teeth and gaps moving through the detection region is detected. In this case, both a transition from a tooth to a gap and also a transition from a gap to a tooth can be detected.

In contrast to the passenger vehicle field, higher temperatures occur in the region of the wheel brakes upon braking in the utility vehicle field, since a significantly higher level of kinetic energy is primarily converted into thermal energy. Since the wheel speed sensors and also the wheel brakes of the utility vehicles are arranged in the region of wheel hubs of the utility vehicle, there is thus a high temperature environment in which the thermal stress of the wheel speed sensors is significantly greater. High temperatures are not continuously present in the high temperature environment here, but occurring peak temperatures, in particular during strong braking, are higher than in the passenger vehicle field.

Due to the use of a component which is configured to adapt the temperature resistance capability of the wheel speed sensor so that the wheel speed sensor is usable in a high temperature environment, or of multiple such components, wheel speed sensors can be arranged in the region of the wheel hubs, and thus in the region of the wheel brakes, wherein a function and a typical lifetime of wheel speed sensors having active pulse sensors is nonetheless ensured. Furthermore, additional functionalities, such as a recognition of the rotational direction of one of the wheels, a measurement of an air gap between the pulse sensor and a pole wheel, a diagnostic functionality, for example for magnetic parameters, a signal transmission with a parity bit, etc., can be implemented.

In one advantageous refinement of the wheel speed sensor, the wheel speed sensor has a region between the active pulse sensor and an environment of the wheel speed sensor, which region has a thermal insulation medium that has a lower thermal conductivity than a thermal conductivity of a material of the housing, as the component in order to adapt the temperature resistance capability of the wheel speed sensor so that the wheel speed sensor is usable in a high temperature environment.

Due to these regions having the thermal insulation material, which has a lower thermal conductivity than the thermal conductivity of the material of the housing, heat is conducted more slowly to heat-sensitive components between the active pulse sensor and the environment, and regions, in which heat-sensitive components are arranged, can be effectively protected against briefly occurring excess temperatures in the high temperature environment.

According to a further advantageous refinement of the wheel speed sensor, the wheel speed sensor has a closed cavity, which is configured to enclose the thermal insulation medium therein.

A closed cavity which has the thermal insulation medium can be produced easily and the thermal insulation medium can be introduced easily into the cavity as needed.

In a further advantageous refinement of the wheel speed sensor, the thermal insulation medium comprises air.

Air, for example, ambient air in an installation environment, is readily present in a cavity open before a final installation of the wheel speed sensor and is thus an inexpensive thermal insulation medium which can be used without additional expenditure.

In a further advantageous refinement of the wheel speed sensor, the wheel speed sensor has multiple closed cavities.

An insulation property of the wheel speed sensor can be defined more precisely by a provision of multiple closed cavities. In particular if a gas is used, for example the air, as the thermal insulation medium, insulation properties are further improved by a reduction or elimination of a convection.

According to a further advantageous refinement of the wheel speed sensor, the multiple closed cavities are arranged adjacent to one another.

Due to this arrangement, an area of a material of the wheel speed sensor which conducts heat better to endangered regions than the insulation material can be reduced, and can thus amplify the insulation effect.

In a further advantageous refinement of the wheel speed sensor, the cavities have a honeycomb structure at least in regions.

Due to the honeycomb structure, in which the multiple cavities are arranged adjacent to one another not only in one direction, but rather in two directions, and a smallest possible intermediate space is present between the cavities, the area of the material of the wheel speed sensor which conducts heat better to endangered regions is further reduced to amplify the insulation effect once again.

In a further advantageous refinement of the wheel speed sensor, the wheel speed sensor has the cavity or the cavities between an outer surface of the housing and an inner surface of the protective cap.

Due to this arrangement of the cavity or the cavities, the cavity is or the cavities are simple to manufacture, since depressions only have to be introduced into the outer surface of the housing or into the inner surface of the protective cap.

According to one advantageous refinement of the wheel speed sensor, the active pulse sensor has an AMR sensor as the component to adapt the temperature resistance capability of the wheel speed sensor so that the wheel speed sensor is usable in a high temperature environment.

An AMR sensor, namely a sensor which has a chip having an "anisotropic magnetoresistive" effect, has a high thermal resistance capability. The wheel speed sensor can thus be used in the high temperature environment having a higher thermal stress even without greater constructive measures According to one advantageous refinement of the wheel speed sensor, the AMR sensor is configured to detect a temperature of the wheel speed sensor.

Upon the use of the AMR sensor, the temperature of the wheel speed sensor can be detected without additional components.

The invention is explained hereinafter on the basis of an exemplary embodiment with reference to the attached drawings.

DETAILED DESCRIPTION

Figure 1:
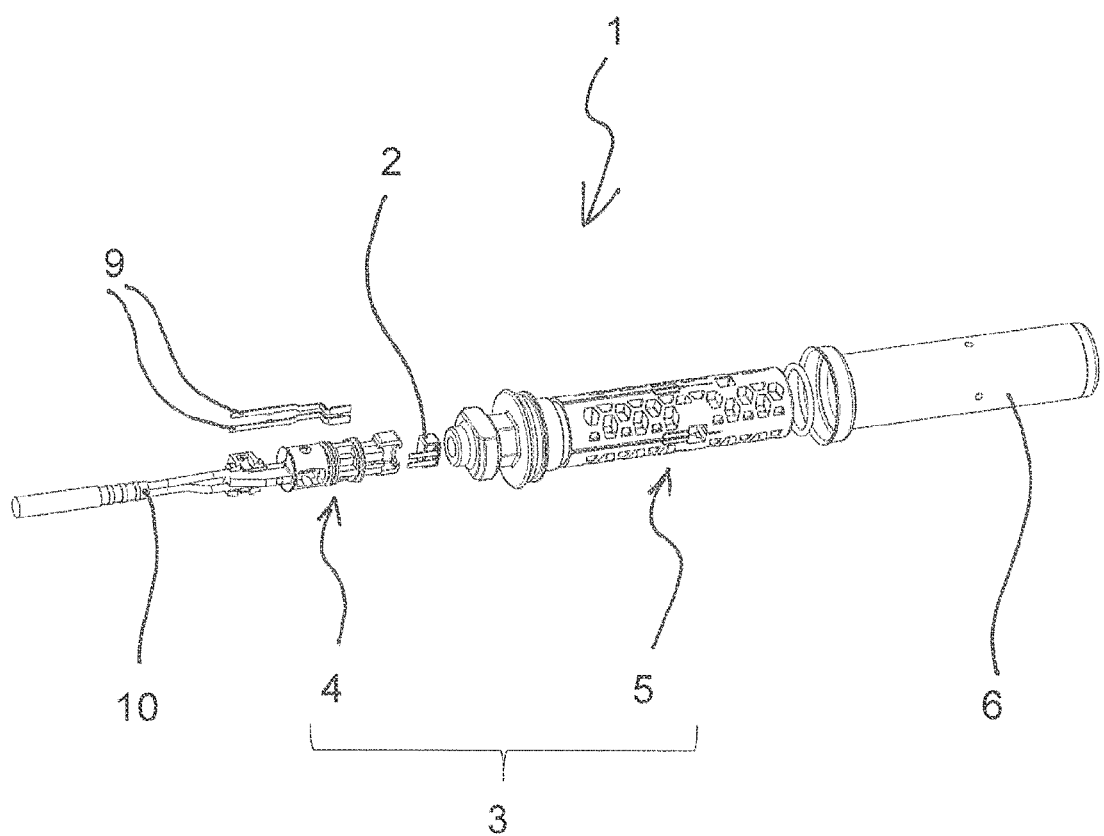
FIG. 1 shows a juxtaposition of components of the wheel speed sensor according to the invention.

FIG. 1 shows a juxtaposition of components of the wheel speed sensor 1 of an exemplary embodiment of the invention. The wheel speed sensor 1 is used in a utility vehicle (not shown). Alternatively, the wheel speed sensor 1 can also be used in other vehicles.

The wheel speed sensor 1 has an active pulse sensor 2 and a housing 3, which partially encloses the active pulse sensor 2.

The housing 3 has a first component 4 made of plastic and a second component 5 made of the same plastic, which is connected to the first component 4. Furthermore, the wheel speed sensor 1 has a protective cap 6, which partially covers the housing 3. In an alternative embodiment, the housing 3 of the wheel speed sensor 1 is completely covered. In FIG. 1, these parts are shown in an illustration arranged adjacent to one another. In the final form, the first component 4 having the active pulse sensor 2 is actually concentrically enclosed by the second component 5. The production takes place as follows: The first component 4 having preinstalled elements, namely the active pulse sensor 2, busbars 9, and a connecting cable 10, is extrusion coated using the same plastic from which the first component 4 was produced, whereby the second component 5 results, which quasi-envelops the first component 4. As shown in FIG. 1 at the right end of the first component 4, this component has a recess so as not to completely cover the active pulse sensor 2. Alternatively, this recess is not provided, and the active pulse sensor 2 is completely enclosed by the housing 3. In further alternative embodiments, all preinstalled elements are not provided, or the first component 4 is alternatively not extrusion coated, but rather, for example, a second component 5 consisting of multiple parts is slipped over the first component 4 and the parts are connected, for example, clipped to one another. Alternatively, the same plastic is not used.

The wheel speed sensor 1 has a region between the active pulse sensor 2 and an environment of the wheel speed sensor 1 having a thermal insulation material which has a lower thermal conductivity than a thermal conductivity of a material of the housing 3, and thus forms the component, using which the temperature resistance capability of the wheel speed sensor can be adapted so that the wheel speed sensor is usable in a high temperature environment.

Figure 2:
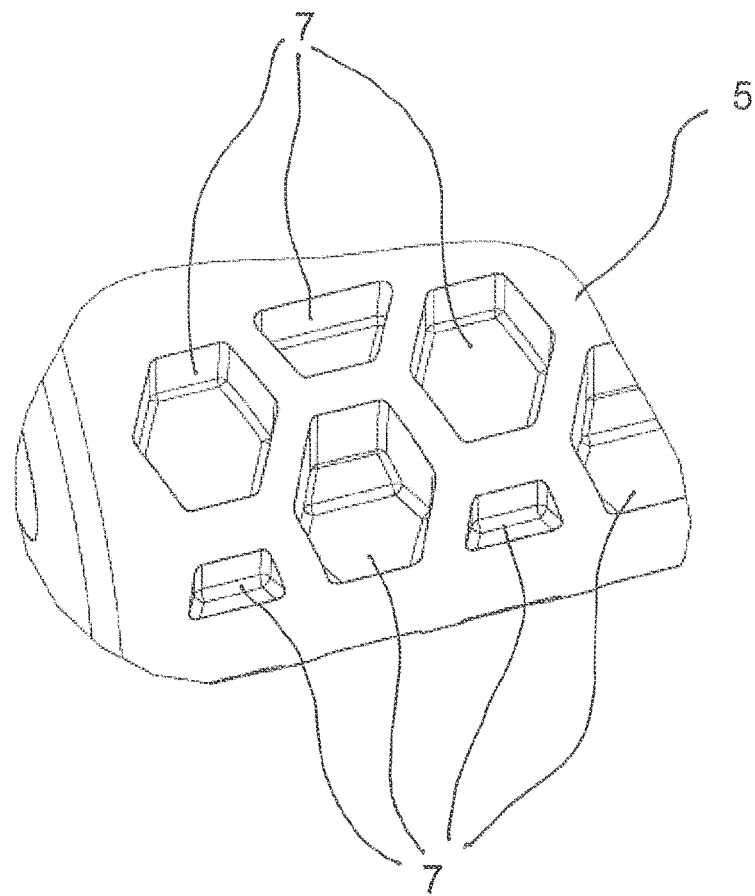
FIG. 2 shows an enlarged illustration of a detail of an outer surface of a second component of the wheel speed sensor of FIG. 1.

The region having the thermal insulation material has, as shown in more detail in FIG. 2—an enlarged illustration of a detail of an outer surface of the second component 5 of the wheel speed sensor 1 of FIG. 1—depressions 7, which are provided between the active pulse sensor 2 and an environment of the wheel speed sensor 1 and are open to the outside.

When the protective cap 6 is installed on the housing 3, multiple cavities are formed between the outer surface of the second component 5, thus the housing 3, and an inner surface of the protective cap 6 by the depressions 7. The wheel speed sensor 1 thus has multiple closed cavities, which are arranged adjacent to one another. In particular, the housing 3 has the cavities in a honeycomb structure, in which the cavities are arranged adjacent to one another in two directions and a smallest possible intermediate space is present between the cavities.

In alternative embodiments, the wheel speed sensor 1 does not have multiple, but only one cavity, which is configured so that the active pulse sensor 3 is insulated from high temperatures so that the temperature resistance capability of the wheel speed sensor 1 is adapted so that the wheel speed sensor is usable in a high temperature environment. In further alternative embodiments, the housing 3 does not have a honeycomb structure, or the cavities are not arranged adjacent to one another. In other alternative embodiments, the cavities are also arranged between the outer surface of the housing 3 and the inner surface of the protective cap 6 or exclusively in the protective cap 6, or are not arranged between the outer surface of the housing 3 and the inner surface of the protective cap 6, but rather, for example, are provided completely inside the material of the protective cap 6 or of the second component 5 of the housing 3.

Air is enclosed in the cavities as a thermal insulation medium, which has a lower thermal conductivity than a thermal conductivity of the material of the housing 3, in particular of the second component 5. In alternative embodiments, another gas is enclosed in the cavities, or liquids or solids made of a material other than that of the housing 3.

The active pulse sensor 2 has an AMR Sensor as the component to adapt the temperature resistance capability of the wheel speed sensor so that the wheel speed sensor is usable in a high temperature environment.

The AMR sensor is configured to execute additional functionalities, namely a recognition of the rotational direction of one of the wheels, a measurement of an air gap between the pulse sensor and a pole wheel, a diagnostic functionality, for example, for magnetic parameters, a signal transmission with a parity bit, and a detection of a temperature of the wheel speed sensor. In alternative embodiments, only one or only a few of the functionalities are executed.

Figure 3:
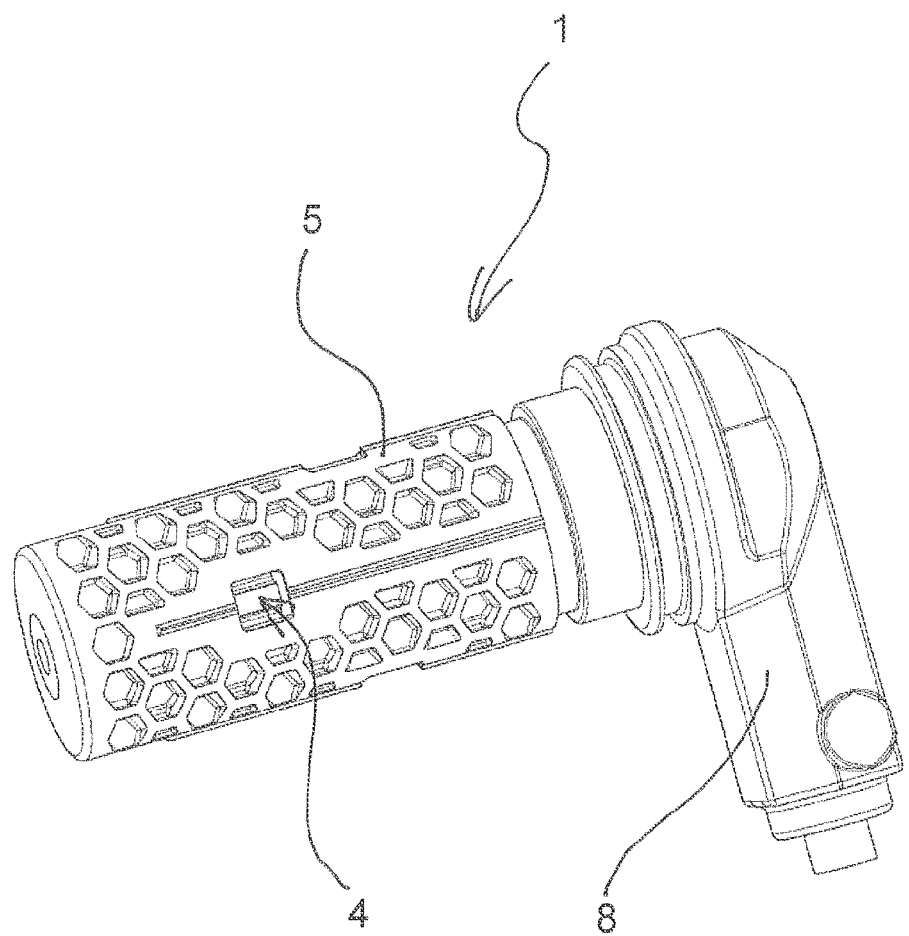
FIG. 3 shows an illustration of a first component of the wheel speed sensor having radial cable outlet, extrusion coated using the second component.

FIG. 3 shows an illustration of the first component 4 of the wheel speed sensor 1 having radial cable outlet 8, extrusion coated using the second component 5.

Figure 4:
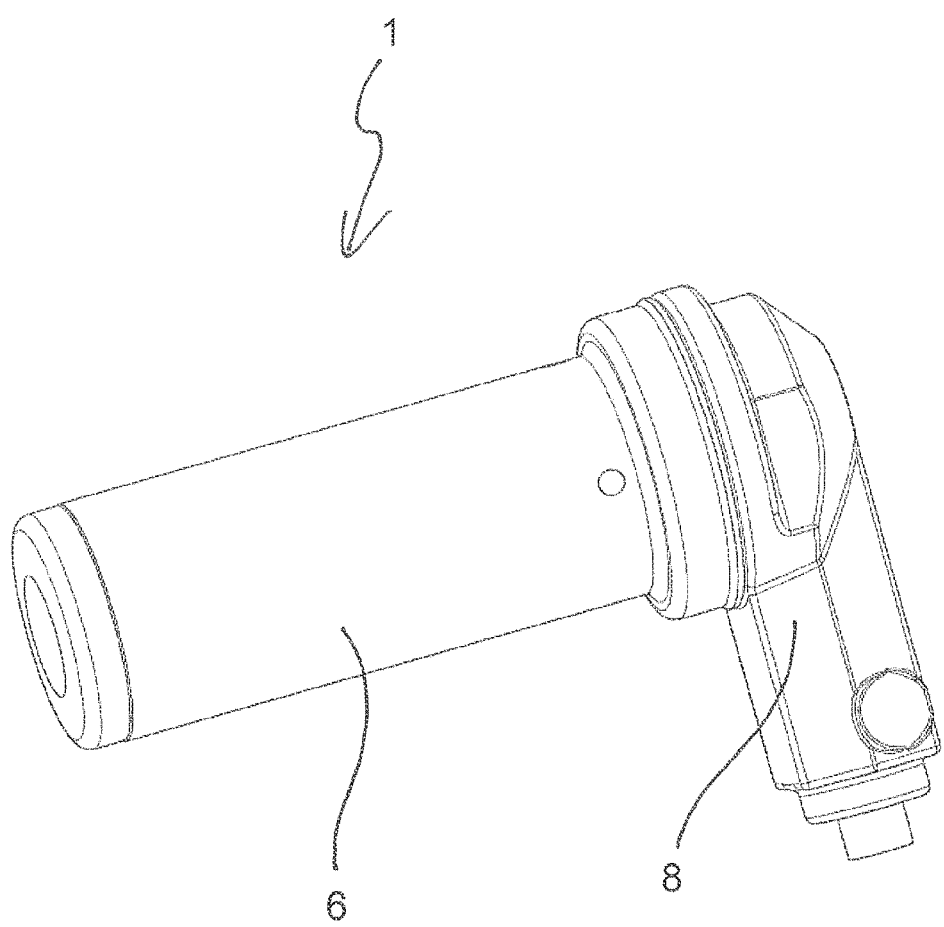
FIG. 4 shows an illustration of the wheel speed sensor of FIG. 3 with installed protective cap.

FIG. 4 shows an illustration of the wheel speed sensor 1 having radial cable outlet having installed protective cap 6.

Furthermore, a utility vehicle has the wheel speed sensor 1. The additional functionalities of the active pulse sensor can be used in the utility vehicle field due to the provision of the wheel speed sensor 1 having the active pulse sensor and the component which adapts the temperature resistance capability of the wheel speed sensors so that the wheel speed sensor is usable in the high temperature environment.

All features represented in the description, the following claims, and the drawings can be essential to the invention both individually and also in any combination with one another.

THE LIST OF REFERENCE NUMERALS IS AS FOLLOWS

1 wheel speed sensor
2 active pulse sensor
3 housing
4 first component
5 second component
6 protective cap
7 depression
8 radial cable outlet
9 busbar
10 connecting cable

The invention claimed is:

1. A wheel speed sensor for a utility vehicle, comprising:
an active pulse sensor,
a housing to at least partially enclose the active pulse sensor, and
a protective cap to at least partially cover the housing;
wherein the wheel speed sensor has at least one component to adapt a temperature resistance capability of the wheel speed sensors so that the wheel speed sensor is usable in a high temperature environment, and
wherein the active pulse sensor includes a magnetic sensor as the component to adapt the temperature resistance capability of the wheel speed sensor so that the wheel speed sensor is usable in the high temperature environment, and
wherein the wheel speed sensor has a region adjacent the active pulse sensor, and wherein the region has a thermal insulation medium that has a lower thermal conductivity than a thermal conductivity of a material of the housing.

2. The wheel speed sensor of claim 1, wherein the wheel speed sensor has a closed cavity to enclose the thermal insulation medium therein.

3. The wheel speed sensor of claim 2, wherein the thermal insulation medium includes air.

4. The wheel speed sensor of claim 2, wherein the wheel speed sensor has multiple closed cavities.

5. The wheel speed sensor of claim 4, wherein the multiple closed cavities are arranged adjacent to one another.

6. The wheel speed sensor of claim 5, wherein the cavities have a honeycomb structure at least in regions.

7. The wheel speed sensor of claim 2, wherein the cavity is or the cavities are provided between an outer surface of the housing and an inner surface of the protective cap.

8. The wheel speed sensor of claim 1, wherein the AMR sensor is configured to detect a temperature of the wheel speed sensor.

9. A wheel speed sensor for a utility vehicle, comprising:
an active pulse sensor,
a housing to at least partially enclose the active pulse sensor, and
a protective cap to at least partially cover the housing;
wherein the wheel speed sensor has at least one component to adapt a temperature resistance capability of the wheel speed sensors so that the wheel speed sensor is usable in a high temperature environment, and
wherein the wheel speed sensor has a region between the active pulse sensor and an environment of the wheel speed sensor, which region has a thermal insulation medium that has a lower thermal conductivity than a thermal conductivity of a material of the housing, and
wherein the at least one component includes the region to adapt the temperature resistance capability of the wheel speed sensor so that the wheel speed sensor is usable in the high temperature environment.

10. The wheel speed sensor of claim 9, wherein the wheel speed sensor has a closed cavity to enclose the thermal insulation medium therein.

11. The wheel speed sensor of claim 10, wherein the thermal insulation medium includes air.

12. The wheel speed sensor of claim 10, wherein the wheel speed sensor has multiple closed cavities.

13. The wheel speed sensor of claim 12, wherein the multiple closed cavities are arranged adjacent to one another.

14. The wheel speed sensor of claim 13, wherein the cavities have a honeycomb structure at least in regions.

15. The wheel speed sensor of claim 14, wherein the cavity is or the cavities are provided between an outer surface of the housing and an inner surface of the protective cap.

16. The wheel speed sensor of claim 9, wherein the active pulse sensor includes an anisotropic magnetoresistive (AMR) sensor as the component to adapt the temperature resistance capability of the wheel speed sensor so that the wheel speed sensor is usable in a high temperature environment.

17. The wheel speed sensor of claim 16, wherein the AMR sensor is configured to detect a temperature of the wheel speed sensor.

\* \* \* \* \*